(12) United States Patent
Hernandez et al.

(10) Patent No.: US 8,769,958 B2
(45) Date of Patent: Jul. 8, 2014

(54) DEVICE FOR ATTACHING A FLAME-HOLDER ARM TO AN AFTERBURNER HOUSING

(75) Inventors: Didier Hyppolyte Hernandez, Quiers (FR); Caroline Jacqueline Denise Berdou, Palaiseau (FR); Jacques Marcel Arthur Bunel, Thiais (FR); Yann Francois Jean-Claude Vuillemont, Paris (FR)

(73) Assignee: SNECMA, Paris (FR)

( * ) Notice: Subject to any disclaimer, the term of this patent is extended or adjusted under 35 U.S.C. 154(b) by 725 days.

(21) Appl. No.: 13/059,347

(22) PCT Filed: Aug. 31, 2009

(86) PCT No.: PCT/EP2009/061224
§ 371 (c)(1),
(2), (4) Date: Feb. 16, 2011

(87) PCT Pub. No.: WO2010/023319
PCT Pub. Date: Mar. 4, 2010

(65) Prior Publication Data
US 2011/0138773 A1   Jun. 16, 2011

(30) Foreign Application Priority Data

Sep. 1, 2008   (FR) ..................................... 08 55856

(51) Int. Cl.
*F02K 3/10*   (2006.01)

(52) U.S. Cl.
USPC ............................................. 60/761; 60/765

(58) Field of Classification Search
USPC .................................... 60/749, 761, 762, 765
See application file for complete search history.

(56) References Cited

U.S. PATENT DOCUMENTS

| | | | | |
|---|---|---|---|---|
| 3,747,345 A * | 7/1973 | Markowski | ..................... | 60/762 |
| 5,359,849 A | 11/1994 | Auffret et al. | | |
| 5,396,761 A * | 3/1995 | Woltmann et al. | .............. | 60/765 |
| 5,400,589 A * | 3/1995 | Mahias et al. | .................. | 60/762 |

(Continued)

FOREIGN PATENT DOCUMENTS

| | | |
|---|---|---|
| EP | 1 229 290 | 8/2002 |
| EP | 1 803 999 | 7/2007 |

(Continued)

OTHER PUBLICATIONS

International Search Report issued Mar. 3, 2010 in PCT/EP09/061224 filed Aug. 31, 2009.

*Primary Examiner* — Ted Kim
(74) *Attorney, Agent, or Firm* — Oblon, Spivak, McClelland, Maier & Neustadt, L.L.P.

(57) ABSTRACT

A flame-holder device for an afterburner of a turbofan, the turbofan including a first inner annular casing and a second inner annular casing, these defining a passage for a primary flow, and an outer annular casing defining with the first inner annular casing a passage for a secondary flow, including at least one arm-support made of metallic material configured to be fixed to the outer casing by an upper plate and at least one flame-holder arm of a one-piece structure of composite material including two mutually attached walls arranged to define a groove whose profile is approximately a V. The walls support, on their upper part situated in the secondary flow, a fixing mechanism for fixing to the arm-support. The upper parts are approximately planar and are positioned facing each other.

15 Claims, 3 Drawing Sheets

(56) References Cited

U.S. PATENT DOCUMENTS

| | | |
|---|---|---|
| 5,497,616 A | 3/1996 | Roberts |
| 6,125,627 A * | 10/2000 | Rice et al. ............... 60/765 |
| 6,463,739 B1 | 10/2002 | Mueller et al. |
| 2007/0039327 A1* | 2/2007 | Blanchard et al. ............ 60/765 |
| 2007/0125086 A1 | 6/2007 | Blanchard et al. |
| 2007/0227152 A1* | 10/2007 | Bunel et al. ............... 60/761 |

FOREIGN PATENT DOCUMENTS

| | | |
|---|---|---|
| FR | 2 699 226 | 6/1994 |
| FR | 2 709 342 | 3/1995 |
| FR | 2865502 A * | 7/2005 |

* cited by examiner

DEVICE FOR ATTACHING A FLAME-HOLDER ARM TO AN AFTERBURNER HOUSING

BACKGROUND OF THE INVENTION

1. Field of the Invention

The field of the present invention is that of bypass turbojets, and more particularly that of the afterburner devices of such jets.

2. Description of the Related Art

In a bypass turbojet with afterburner, with an afterbody of the type illustrated in FIG. 1, the airflow is first of all aspirated by a low-pressure compressor. A first portion of this airflow on leaving the low-pressure compressor feeds a high-pressure compressor, while a second portion passes into a first passageway 1 defined between an outer annular housing 2 and a first inner annular housing 3. The airflow compressed by the high-pressure compressor feeds a combustion chamber which itself feeds combustion gas to a high-pressure turbine followed by a low-pressure turbine and the outlet of which passes through a second passageway 4 defined between the first inner annular housing 3 (or confluence sheet) and a second inner annular housing 5 (or exhaust cone).

The combustion gases that feed the second passageway 4 have a high temperature and constitute what is called is a main flow (or hot flow). The air that feeds the first passageway 1 has a temperature that is substantially lower than that of the main flow and constitutes what is called a bypass flow (or cold flow).

Downstream of the turbine outlet, it is possible to produce an increase in thrust by injecting an additional quantity of fuel into the main and bypass flows, with its combustion in an afterburner channel. This system comprises mainly a set of arms 7, called flame-holder arms, and a spray ring 6. The spray ring 6 is supported by the arms 7 and placed in the bypass flow, in the vicinity of the confluence sheet 3.

A portion of the injection takes place with the aid of the spray ring 6 which makes it possible to inject a portion of the fuel evenly and to stabilize the flame.

Moreover, each arm contains a fuel injector which injects, into the main flow, the other portion of the afterburner fuel.

The arm is also fitted with a ventilation tube the role of which is to cool on the one hand the metal walls of the arm that are swept by the main flow, and, on the other hand, the injector, air originating directly from the cold flow.

The injector-tube assembly is itself protected from the radiation of the flame by another metal part, the heat shield.

In the prior art, the arms 7 were initially made of metal, and cast. This configuration had the drawback of having to ensure that they were cooled. In more recent implementations, they have been replaced by parts made in ceramic matrix composite (CMC) material which have the advantage of being lighter and more resistant to high temperatures. It is then possible to dispense with the ventilation systems to which the metal systems are condemned.

On the other hand, these materials have thermal expansion characteristics that are very different from those of the materials constituting the engine housings to which they are attached. It is therefore necessary to take account of the effects of these differences in the way the arms 7 are attached to the structure of the engine, notably to the outer housing 2.

Several devices have been proposed for attaching the arms 7, whether the latter are made of metal or of composite material. They are described in documents FR2699226, FR2699227 or else in documents U.S. Pat. No. 5,103,638, GB 2 295 214, U.S. Pat. No. 5,022,805 or U.S. Pat. No. 5,090,198.

Document FR2865502 by the applicant describes, for its part, a one-piece flame-holder arm 7 made of composite material (ceramic matrix composite, or CMC) in order to withstand the high temperatures, which is attached directly to the outer housing 2. This arm has the shape of two walls joined together in the bottom portion by a throat, with, in the top portion a recess that is open to the cold flow and two curved flanges. The attachment is achieved via these two flanges which are bolted to the housing, which, during manufacture of the arm, requires the folding of the fibres of the composite material in order to give them the appropriate shape. As indicated above, these flanges made of composite material do not have the same coefficient of expansion as the metal of the housing. Consequently, on the one hand, the great difference in expansion between the CMC arm and the metal housing may cause a loss of tightness between the 2 parts when hot, and, on the other hand, attaching the CMC arms to the housing generates stresses in the flanges of the arms. The consequences of these stresses are further amplified by the fragility of the flanges in this zone due to the folding of the CMC fibres. These stresses are quite clearly prejudicial to their service life.

Document EP1803999 by the applicant proposed a solution attempting to solve this problem of stresses by interposing a metal arm support between the arm and the housing, that is to say by attaching the arm to the support and by attaching the support to the outer housing 2. However, the lateral lugs of the support, being brazed to the top plate of the support at the interface with the housing, are subjected to considerable thermal stresses and to considerable aerodynamic forces. The service life of the arms in this configuration therefore remains insufficient because of the great strain on the support at the brazed joints.

BRIEF SUMMARY OF THE INVENTION

The object of the invention is to improve the situation by proposing flame-holder arms that have better mechanical strength.

Accordingly, the subject of the invention is a flame-holder device for an afterburner of a bypass turbojet, the said turbojet comprising a first inner annular housing and a second inner annular housing, defining a passageway for a main flow, and an outer annular housing defining with the said first inner annular housing a passageway for a bypass flow, comprising at least one arm support made of metal and designed to be attached to the said outer housing by means of an upper plate and at least one flame-holder arm consisting of a one-piece structure made of composite material comprising two joined-together walls arranged so as to define a throat having a substantially V-shaped profile, the said walls supporting on their top portion situated in the bypass flow means of attachment to the said arm support, characterized in that the said top portions are flat and positioned facing one another.

Removing the folding of the fibres substantially improves the service life of the flame-holder arms.

According to particular embodiments:

the said attachment means are bolts interfacing with pierced holes made in the said top portions, elastic washers being positioned between the head of the said bolts and the bearing faces via which these heads bear on the said top portions, so as to maintain the tightness despite the differences in expansion of the composite material and of the metal, the arm support comprises two lateral struts of which the inside each consists of a hollow cavity which leads, in the direction of the outer housing, into a top cavity hollowed out of the top plate; these cavities have the effect of helping to regulate the afterburner carburation, bosses to ensure that the bolts for attaching the arm to the arm support pass in a sealed manner through the cavities in the struts a pressure-tapping hole is pierced in the bottom portion of each of the struts in order to feed air to the said cavities, an orifice for letting the air out being arranged in the top portion of the said device at the outer housing, the pressure-tapping holes are fitted with a ring designed to seal the air passageway between the outside of the flame-holder arm and the arm support, the top portions of the walls comprise a hole positioned, after assembly, facing the pressure-tapping holes pierced in the bottom portion of the struts of the support, the top plate comprises a pierced hole for the passage of a fuel injector, the injector is attached to the outer housing and guided in the bottom portion by a guide shoe attached to a ventilation tube, itself connected at the top portion by a swivelling connection at the arm support, the arm support comprises an intermediate plate and a bottom plate both capable of supporting a spray ring of the afterburner system, the bottom plate supports the inner face of the said spray ring by means of bearing faces the overall surface area of which is less than 25% of that of the bottom plate, the bottom plate comprises a passageway hole for the injector and a cylindrical passageway hole defining a swivel connection between the ventilation tube and the arm support, the lateral struts on the one hand, and the top portions on the other hand diverge from one another relative to the plane of symmetry of the arm support, the angle of divergence is less than 7°; this angle of divergence has the effect of limiting the axial clearance due to the relative positioning of the arm with respect to the support, the bosses are oblong so as to have sufficient material to allow counterbores in the struts facing the pierced holes made in the top portions of the arm.

The invention also claims an afterbody of a bypass turbojet with an afterburner comprising such a flame-holder device. It finally claims a bypass turbojet with an afterburner comprising such an afterbody.

BRIEF DESCRIPTION OF THE SEVERAL VIEWS OF THE DRAWINGS

The invention will be better understood and other objects, details, features and advantages of the latter will appear more clearly in the course of the following detailed explanatory description of several embodiments of the invention given as purely illustrative and non-limiting examples, with reference to the appended schematic drawings.

In these drawings.

DETAILED DESCRIPTION OF THE INVENTION

In the rest of the text, the words "outer" and "inner" are used with reference to the air stream, outer relating to the outside of the engine and inner to its axis of symmetry.

Figure 1:
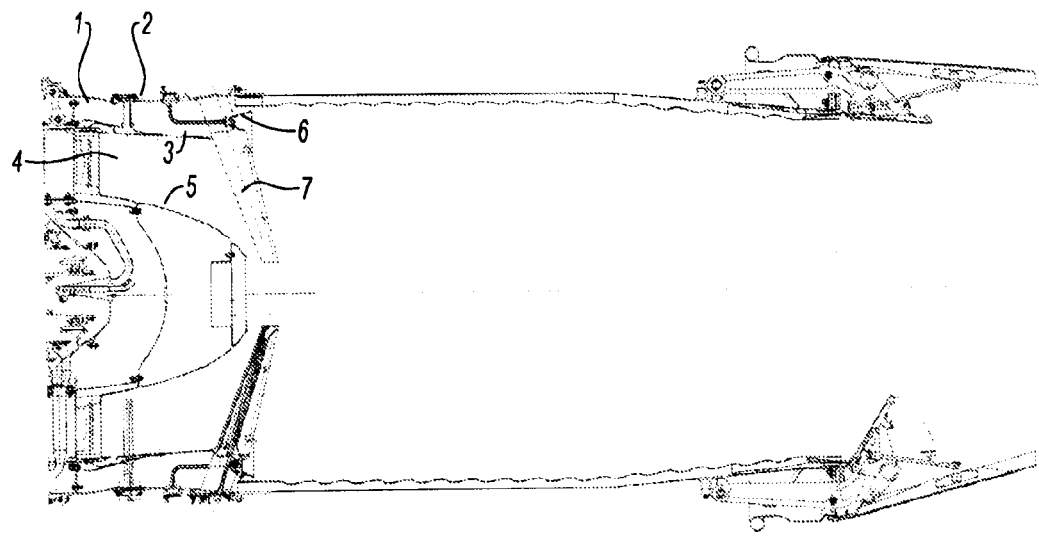
FIG. 1 is a view in section of an afterbody of a bypass turbojet with afterburner.
Figure 2:
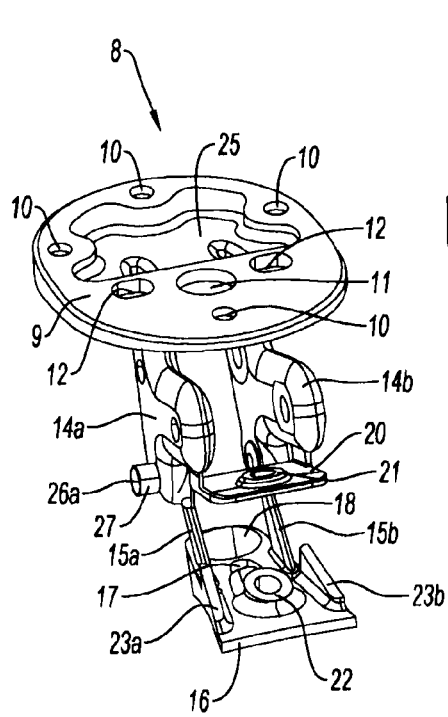
FIG. 2 is a view in perspective of a flame-holder arm support according to one embodiment of the invention.
Figure 3:
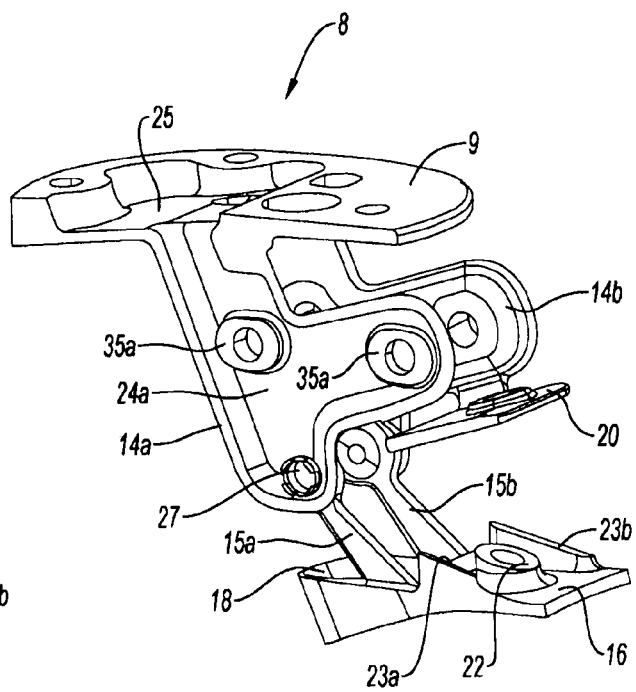
FIG. 3 is a view in perspective and in section of a flame-holder arm support according to one embodiment of the invention.
Figure 6:
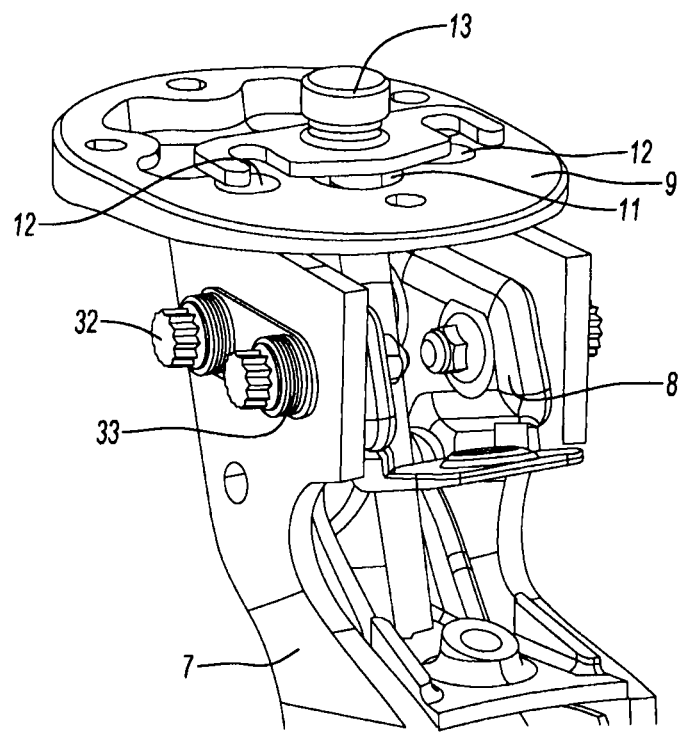
FIG. 6 is a view in perspective of an arm support and of a flame-holder arm according to one embodiment of the invention, in the assembled position.

Reference is made to FIGS. 2 and 3 which show an arm support 8 comprising a top plate 9 designed to be attached to the outer housing 2 by means of four screw-nut systems or pairs or arrangements or, not shown, passing through bores 10. The top plate 9 also comprises a pierced hole 11 through which a fuel injector passes and two holes 12 for housing the heads of the screws, called flat-head screws, designed to attach the head of the injector, as can be seen in FIG. 6.

Extending from the top plate 9 are two lateral struts 14a and 14b, shown here, without this shape being imperative, in the form of a T turned through 90°, the top branch of the T developing from the top plate 9 and serving at its other end as a support to two branches 15a and 15b supporting a bottom plate 16. The bottom plate also comprises two pierced holes 17 and 18 into which pass respectively the fuel injector and a ventilation tube, via a swivel connection allowing the free movement of the tube. To the central branch of the T of each of the lateral struts 14a and 14b is attached an intermediate plate 20 which, with the bottom plate 16, is designed to serve as a support to a spray ring 6. Accordingly, the intermediate plate 20 comprises a pierced hole 21 into which passes a means, not shown, for attaching the outer portion of the spray ring 6 while the bottom plate 16 comprises a pierced hole 22 into which passes a means, not shown, for attaching the inner portion of the spray ring 6. The bottom plate 16 also comprises two bearing faces 23a and 23b which form, with the top portion of the pierced hole 22, a bearing face on which the inner portion of the spray ring 6 rests. In order to minimize the heat transfers to the arm support 8 from the spray ring 6, the inner portion of which is situated in the hot flow, the areas of contact between the spray ring and the bottom plate 16 are reduced as much as possible; consequently, the area of the bearing faces 23a and 23b and of the pierced hole 22 represent at most 25% of the area of the bottom plate 16.

Continuing reference to FIGS. 2 and 3, reveals two lateral struts 14a and 14b the inside of each of which consists of a hollow cavity 24a and 24b which leads, in the direction of the outer housing, into a top cavity 25 hollowed out in the top plate 9. A pressure-tapping hole 26 is pierced in the bottom portion of each of the struts in order to feed air to this cavity. The air thus flows into the cavities 24 and 25 and is then discharged to the outside of the flame-holder device through the outer housing 2. The two pressure-tapping holes 26a and 26b can, in one particular embodiment shown in FIGS. 2 and 3, be fitted with a ring 27 designed to pass through the flame-holder arm 7 in order to seal the air passageway between the outside of the flame-holder arm 7 and the arm support 8. This ring has the shape of a bush which rests in a sealed manner on the inner face of the corresponding strut and which passes through the strut 14 of the arm 7 through its whole thickness. The portion of the ring 27 inside the cavity 24 comprises holes on its circumference in order to allow the air from the cold flow to penetrate the said cavity.

Within each cavity, two oblong bosses 35 ensure that the means for attaching the flame-holder arm 7 to the arm support 8 pass through in a sealed manner. They also ensure the mechanical strength of the struts 14 when the arm 7 is tightened onto the arm support 8, preventing the cavity 24 from collapsing.

Figure 4:
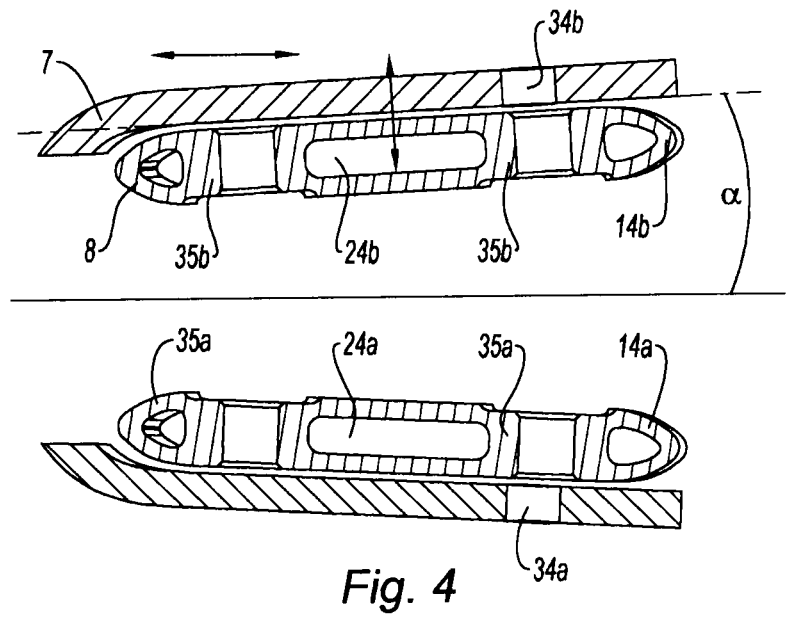
FIG. 4 is a view from above and in section of an arm support and of a flame-holder arm according to one embodiment of the invention.

With reference to FIG. 4, it can be seen that the two struts 14a and 14b are not positioned parallel to one another, but that they both diverge by an angle α relative to the plane of symmetry of the support 8. This angle α corresponds to the angle made by the two lateral flanges of the flame-holder arm 7, which have a divergent profile in order to satisfy the need to demould the part made of composite material during its production. The corresponding relief angle α is typically less than 7°, and preferably approximately 3°.

The existence of this relief angle means that the relative positioning of the arm support inside the V formed by the lateral walls of the flame-holder arm 7 is predetermined because it corresponds to the position of abutment of the arm support 8 inside the arm 7. However, the tolerances on the piercing of the holes 34 in the CMC are too great for holes 34 made in the lateral walls of the flame-holder arm for attaching it to the arm support 8 to be exactly opposite the holes that would have been made in the struts of the arm support beforehand. In order to take account of this inaccuracy, the bosses 35 at the holes for attaching the arm 7 are oblong in the direction of the axis of the engine, with the long side oriented towards the bottom of the V of the arm 7; they are also made of sufficient material so that a counterboring of the supporting struts can be carried out, during assembly, facing the holes 34 made in the lateral walls of the flame-holder arm 7.

Figure 5:
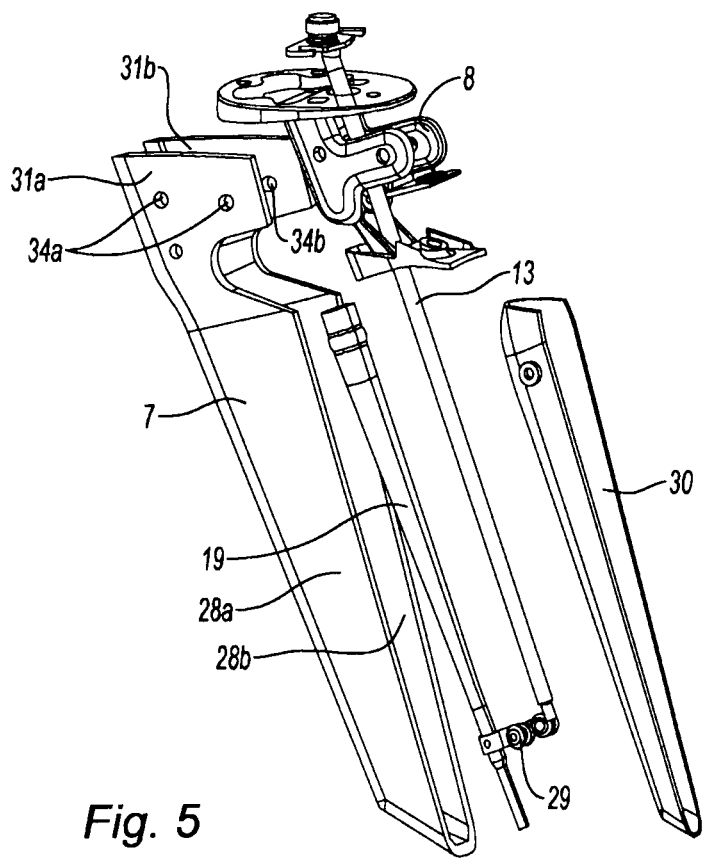
FIG. 5 is a half-section in perspective of an arm support and of a flame-holder arm according to one embodiment of the invention, assembled in an afterburner system of a bypass turbojet.

Reference is now made to FIG. 5, which shows a flame-holder arm 7 made in the form of a one-piece structure of composite material. It is preferably made of ceramic matrix composite (CMC) which is particularly resistant to high temperatures and which is not very heavy compared with metals. As an example, the structure is made from a preform of fibres, notably silicon carbide or carbon, impregnated with ceramic matrix in the liquid or gaseous phase.

The flame-holder arm 7 comprises two substantially symmetrical walls 28a and 28b which join together on one longitudinal side so as to define a throat of which the profile, in a cross section, is substantially V-shaped. As indicated above, these two walls diverge relative to one another at an angle α. These two walls join together at their inner end, that is to say their end oriented towards the centre of the gas stream, in order to form a foot which is bevel shaped in order to be in the axis of the main flow and promote the flowing of the latter. At its other end, each wall 28a and 28b comprises a cutout, suitable for the insertion of the spray ring 6, which cutout is aligned, after assembly, with the intermediate plate 20 and with the bearing faces 22, 23a and 23b of the bottom plate 16. The walls are also flared in the direction of the outer housing 2, for their top portion, that is to say the portion situated in the bypass flow, above the cutouts, so as to envelop the arm support 8.

The top portions 31a and 31b of each of the walls are substantially flat and positioned facing one another. They are moreover each pierced with three holes, two holes 34 being used for attaching the arm 7 to the arm support 8, and the third being aligned with the pressure-tapping hole 26a or 26b, or with the sealing ring 27, of one of the struts of the arm support 8 in order to feed into the corresponding cavity 24a or 24b.

FIG. 5 also shows the ventilation tube 19 and the fuel injector 13. The ventilation tube 19 is attached at the bottom portion to a guide shoe 29, to which the injector 13 is attached, and is guided in the top portion by a spherical centring element contained in a cylindrical passageway of the bottom plate of the support. It finally shows a heat shield 30, which reproduces the shape of the flame-holder arm 7 and which is inserted into the latter in order to protect the fuel injector 13 and the ventilation tube 19 from the radiation of the afterburner flame and thus to prevent the of phenomenon coking in the injector.

FIG. 6 shows the flame-holder arm 7 mounted on its arm support 8. The assembly is held in position by four bolts 32 which pass through the arm 7 by passing through the two holes 34a and 34b each made in the top portions 31a, 31b of the walls 28a and 28b and which pass through the arm support 8 passing through the counterbores made in the bosses 35a and 35b of the struts 14a and 14b. A backplate is positioned between the head of each screw and the corresponding wall of the arm 7 in order, in a known manner, to spread the clamping forces and protect the CMC material in compression when the bolts are tightened. Also inserted between the head of the screw and the backplate are elastic washers which maintain the clamping tightness despite the differences in expansion that there are, when hot and when cold, between the arm 7 and the bolt 32.

The injector 13 is positioned inside the flame-holder arm 7 and comprises at its top end a plate designed to attach it to the outer housing 2. This plate comprises two open-ended pierced holes through which there passes the body of a screw the head of which is placed in the holes 12 made in the top plate 9 of the arm support 8, and which allows the head of the injector 13 to be tightened onto the outer housing 2.

Figure 7:
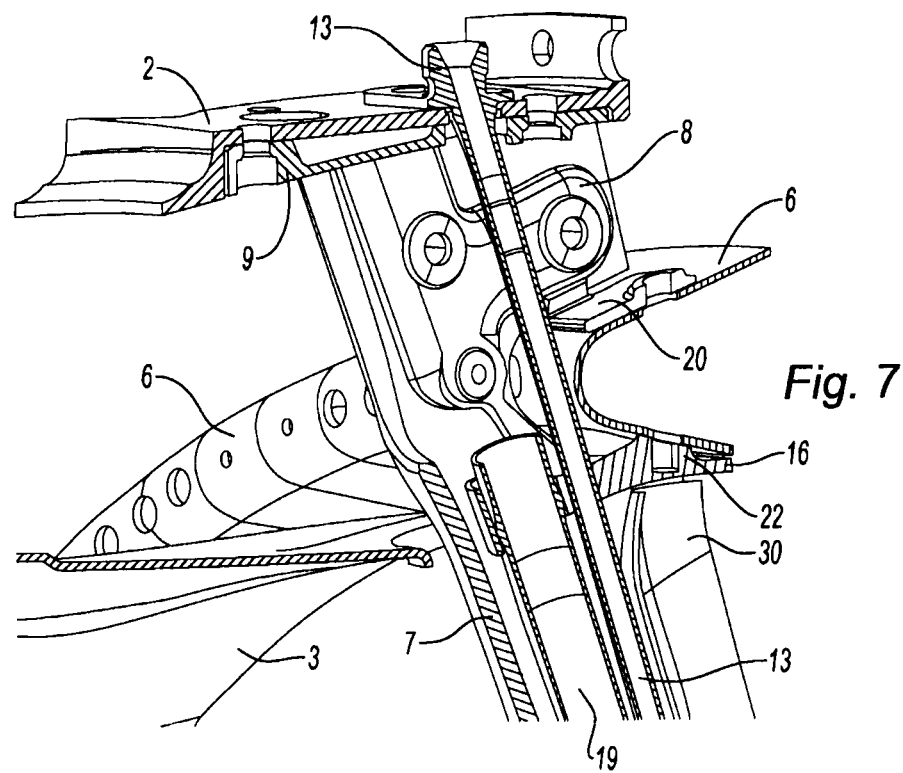
FIG. 7 is a view in perspective of an arm support and of a flame-holder arm according to one embodiment of the invention, assembled and incorporated into the afterburning module consisting of the outer housing, the confluence sheet and the spray ring.

FIG. 7 shows the assembly of the flame-holder arm 7 and of the arm support 8 in position in the afterbody of a bypass turbojet with an afterburner. The spray ring 6 is positioned in the cutout made in the flame-holder arm 7 and rests on the arm support 8 via, on the one hand the intermediate plate 20 and, on the other hand, the bearing faces 23a and 23b and the top portion of the pierced hole 22 of the bottom plate 16.

Compared with the flame-holder device of the prior art, represented by the patent application EP1803999, the present invention has the following advantages:

the hollow cavities 24a and 24b of the struts 14a and 14b and the cavity 25 of the top plate 9 form calming chambers for the air tapped from the bypass flow at the pressure-tapping points 26a and 26b. The pressure of this air when it leaves the top cavity 25 corresponds precisely to the static pressure in the bypass flow at the flame-holders and can be used by the afterburner regulation system, the flame-holder arm 7 rests against the arm support 8 in a position that corresponds to the abutment of the arm support in the bottom of the V of the flame-holder arm. Since the counterbores in the struts of the arm support are pierced when the two parts are in this position, the two parts are connected by the bolts 32 without the prestresses associated with the relative positioning of the two parts, the forces applied to the flame-holder arms 7 are transmitted to the outer housing 2 exclusively by metal parts, which eliminates the risk of damaging the parts made of composite materials, the production of the arm 7 and that of the arm support 8 can be begun in parallel, being paired up only when the counterbores are made in the struts of the arm support 8, the shape of the arm 7 is simplified which makes it easier to produce, the inner face of the top plate 9 is unencumbered and is no longer in contact with the flanges of the arm 7. It is therefore possible to position therein four bores 10, instead of two, for the attachment of the top plate and thus obtain a more secure attachment of the latter to the outer housing 2, the arm 7 can be removed from the arm support 8, which makes it possible to disassemble them and, for example, to replace the ventilation tube 19 without having to destroy the brazed joints on one of these parts.

Although the invention has been described in relation to one particular embodiment, it is quite clear that it is in no way limited thereto and that it includes all the technical equivalents of the means described.

The invention claimed is:

1. A flame-holder device for an afterburner of a bypass turbojet, the turbojet including a first inner annular housing and a second inner annular housing, defining a passageway for a main flow, and an outer annular housing defining with the first inner annular housing a passageway for a bypass flow, the device comprising:
    at least one arm support made of metal and configured to be attached to the outer housing by an upper plate; and
    at least one flame-holder arm of a one-piece structure made of composite material including two joined-together walls arranged to define a throat having a substantially V-shaped profile, the walls supporting on their top portions situated in the bypass flow an attachment device which attaches the flame-holder arm to the arm support,
    wherein the top portions are flat and positioned facing one another,
    wherein the arm support includes two lateral struts of which on an inside each includes a hollow cavity which leads, in a direction of the outer housing, into a top cavity hollowed out of the upper plate, and
    wherein the flame-holder device further comprises at least one pressure-tapping hole pierced in a bottom portion of each of the struts to feed air to the hollow and the top cavities, an orifice for letting the air out being arranged in the top portion of the device at the outer housing.

2. A flame-holder device for an afterburner according to claim 1, wherein the attachment device includes bolts interfacing with the pierced holes made in the top portions, elastic washers being positioned between a head of the bolts and bearing faces via which the heads bear on the top portions, so as to maintain tightness despite differences in expansion of the composite material and of the metal.

3. A flame-holder device for an afterburner according to claim 2, further comprising bosses so that the bolts for attaching the arm to the arm support pass in a sealed manner through the cavities in the struts.

4. A flame-holder device for an afterburner according to claim 3, wherein the bosses are oblong so as to have sufficient material to allow counterbores in the struts facing the pierced holes made in the top portions of the arm.

5. A flame-holder device for an afterburner according to claim 1, further comprising pressure-tapping holes fitted with a ring configured to seal the air passageway between the outside of the flame-holder arm and the arm support.

6. A flame-holder device for an afterburner according to claim 1, wherein the top portions of the walls include a hole positioned, after assembly, facing the pressure-tapping holes pierced in the bottom portion of the struts.

7. A flame-holder device for an afterburner according to claim 1, wherein the upper plate includes a pierced hole for the passage of a fuel injector.

8. A flame-holder device for an afterburner according to claim 7, wherein the injector is attached to the outer housing and guided in a bottom portion by a guide shoe attached to a ventilation tube, the ventilation tube being connected at the top portion by a swivelling connection at the arm support.

9. A flame-holder device for an afterburner according to claim 1, wherein the arm support includes an intermediate plate and a bottom plate both configured to support a spray ring of the afterburner system.

10. A flame-holder device for an afterburner according to claim 9, wherein the bottom plate supports the inner face of the spray ring by bearing faces with an overall surface area less than 25% of an overall surface area of the bottom plate.

11. A flame-holder device for an afterburner according to claim 9, wherein the bottom plate includes a passageway hole for an injector and a cylindrical passageway hole defining a swivel connection between the ventilation tube and the arm support.

12. A flame-holder device for an afterburner according to claim 1, wherein the lateral struts and the top portions diverge from one another relative to a plane of symmetry of the arm support.

13. A flame-holder device for an afterburner according to claim 12, wherein the angle of divergence relative to the plane of symmetry of the arm support is less than 7°.

14. An afterbody of a bypass turbojet with afterburner, comprising a flame-holder device according to claim 1.

15. A bypass turbojet with afterburner comprising an afterbody according to claim 14.

* * * * *